United States Patent
Edwards et al.

(10) Patent No.: US 12,332,993 B2
(45) Date of Patent: *Jun. 17, 2025

(54) THIRD PARTY DATA PROCESSING FOR IMPROVEMENT OF AUTHENTICATION QUESTIONS

(71) Applicant: Capital One Services, LLC, McLean, VA (US)

(72) Inventors: Joshua Edwards, Philadelphia, PA (US); Vyjayanthi Vadrevu, Pflugerville, TX (US); Tyler Maiman, Melville, NY (US); Viraj Chaudhary, Katy, TX (US); Daniel Miller, Brooklyn, NY (US); David Septimus, New York, NY (US); Jenny Melendez, Falls Church, VA (US); Samuel Rapowitz, Roswell, GA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/545,491

(22) Filed: Dec. 19, 2023

(65) Prior Publication Data
US 2024/0119136 A1 Apr. 11, 2024

Related U.S. Application Data

(63) Continuation of application No. 17/314,673, filed on May 7, 2021, now Pat. No. 11,886,570.

(51) Int. Cl.
*G06F 21/45* (2013.01)
*G06F 16/24* (2019.01)
(Continued)

(52) U.S. Cl.
CPC ............. *G06F 21/45* (2013.01); *G06F 16/24* (2019.01); *G06F 40/40* (2020.01); *G06N 3/04* (2013.01); *H04L 63/08* (2013.01); *H04L 63/102* (2013.01)

(58) Field of Classification Search
CPC .......... G06F 21/45; G06F 16/24; G06F 40/40; G06N 3/04; H04L 63/08; H04L 63/102
(Continued)

(56) References Cited

U.S. PATENT DOCUMENTS

| | | | |
|---|---|---|---|
| 2017/0078262 A1* | 3/2017 | Riddick | H04L 63/08 |
| 2019/0259030 A1* | 8/2019 | Burger | G06Q 20/405 |
| 2019/0362397 A1* | 11/2019 | Psota | G06Q 30/0241 |

OTHER PUBLICATIONS

Mar. 13, 2019, Kh, Is Machine Learning Solving User Authentication Challenges in App Development, <<https://datafloq.com/read/machine-learning-solving-user-authentication-apps.6152>>, 13 pages, printed May 6, 2021.

(Continued)

*Primary Examiner* — Linglan Edwards
*Assistant Examiner* — Phuc Pham
(74) *Attorney, Agent, or Firm* — Banner & Witcoff, Ltd.

(57) ABSTRACT

Methods, systems, and apparatuses are described herein for improving the accuracy of synthetic authentication questions by analyzing third party account data. A request for access to a first account associated with a user may be received. The first account may be managed by a first organization. A transactions database might be queried for first account data. Second account data corresponding to a second account associated with the user might be received. That second account may be managed by a second organization different from the first organization. One or more second transactions, unique to the second account, may be identified. A synthetic transaction, configured to be different from transactions in the first account and the one or more (Continued)

second transactions, may be generated. An authentication question may be generated based on the synthetic transaction. Access to the first account might be provided based on a response to the authentication question.

20 Claims, 6 Drawing Sheets

(51) Int. Cl.
    *G06F 40/40*     (2020.01)
    *G06N 3/04*     (2023.01)
    *H04L 9/40*     (2022.01)
    *H04L 29/06*     (2006.01)

(58) Field of Classification Search
    USPC .......................................................... 726/6
    See application file for complete search history.

(56) References Cited

OTHER PUBLICATIONS

May 22, 2017, Woodecki, Product & Technology, Answers to Your Top 3 Questions About Adaptive Authentication—One Login, <<https://www.onelogin.com/blog/answers-to-your-top-3-questions-about-adaptive-authentication>>, 5 pages, printed May 6, 2021.

Madden, Idaptive is Taking Machine Learning for Authentication and Applying it to Authorization, 7 pages, <<https://searchsecurity.techtarget.com/opinion/Idaptive-is-taking-machine-learning-for-authentication-and-applying-it-to-authorization>>, printed May 6, 2021.

May 24, 2018, Steensen, Machine Learning in the Payments Industry, 34 pages, <<https://usa.visa.com/dam/VCOM/global/support-legal/documents/webinar-machine-learning.pdf>>, printed May 6, 2021.

Feb. 21, 2021, Chuprina, SPD Stories, Machine Learning, Credit Card Fraud Detection: Top ML Solutions in 2021, 23 pages, <<https:spd.group/machine-learning/credit-card-fraud-detection/>>, printed May 6, 2021.

Sep. 17, 2019, AI and ML in Finance, Use Cases in Banking, Insurance, Investment, AltexSoft, 10 pages, <<https://www.altexsoft.com/blog/datascience/machine-learning-use-cases-in-finance/>>, printed May 6, 2021.

Bani-Hane, et al., Online Authentication Methods Used in Banks and Attacks Against These Methods, Science Direct, 8 pages, <<https://www.sciencedirect.com/science/article/pii/S1877050919306167/pdf?md5=37f0659886e2c7da9c0802cb300dbf6b&pid=1-s2.0-S1877050919306167-main.pdf>>, printed May 6, 2021.

Aug. 22, 2022—International Search Report and Written Opinion—PCT/US2022/072151.

* cited by examiner

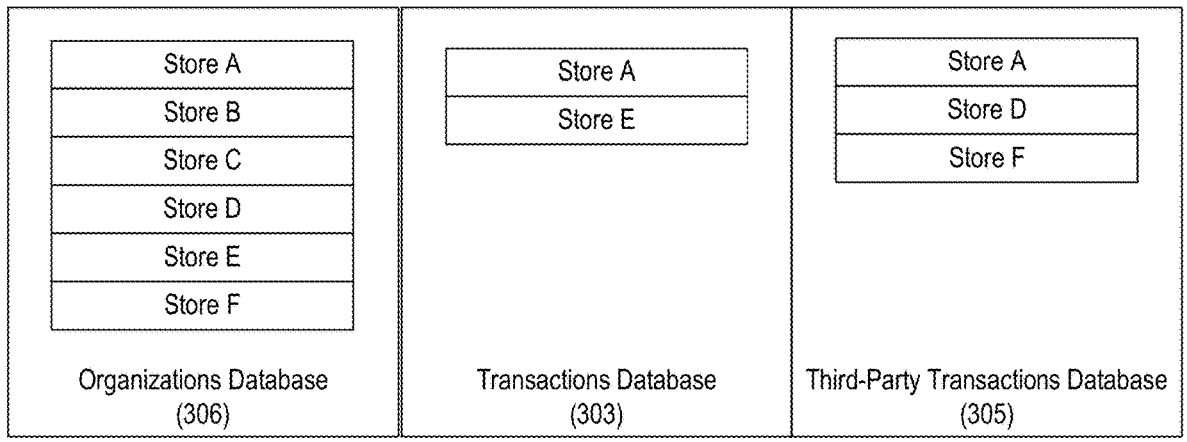
FIG. 6A
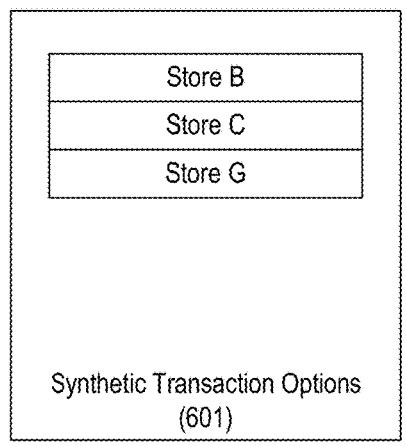
FIG. 6B
FIG. 6C

THIRD PARTY DATA PROCESSING FOR IMPROVEMENT OF AUTHENTICATION QUESTIONS

CROSS REFERENCE TO RELATED APPLICATION

This application is a continuation of U.S. patent application Ser. No. 17/314,673, filed May 7, 2021, entitled "Third Party Data Processing for Improvement of Authentication Questions," the disclosure of which is hereby incorporated by reference in its entirety.

FIELD OF USE

Aspects of the disclosure relate generally to authentication of computing devices. More specifically, aspects of the disclosure may provide for enhanced authentication of computing devices based on analyzing transactions conducted by users of those computing devices.

BACKGROUND

As part of determining whether to grant a user device access to content (e.g., a website containing personal information, such as banking information), a user of the user device might be prompted with one or more authentication questions. Such questions might relate to, for example, a password of the user, a personal identification number (PIN) of the user, or the like. Those questions might additionally and/or alternatively be generated based on personal information of the user. For example, when setting up an account, a user might provide a variety of answers to predetermined questions (e.g., "Where was your father born?," "Who was your best friend in high school?"), and those questions might be presented to the user as part of an authentication process. As another example, a commercially-available database of personal information might be queried to determine personal information for a user (e.g., their birthdate, birth state, etc.), and that information might be used to generate an authentication question (e.g., "Where were you born, and in what year?").

As part of authenticating a computing device, information about financial transactions conducted by a user of that computing device might be used to generate authentication questions as well. For example, a user might be asked questions about one or more transactions conducted by the user in the past (e.g., "Where did you get coffee yesterday?," "How much did you spend on coffee yesterday?," or the like). Such questions might prompt a user to provide a textual answer (e.g., by inputting an answer in a text field), to select one of a plurality of answers (e.g., select a single correct answer from a plurality of candidate answers), or the like.

In some instances, these authentication questions might be based on false information, such as a synthetic transaction. A synthetic transaction might comprise a transaction that, while fake, is generated to appear realistic. In this manner, while a legitimate user may be able to recognize that the transaction is fake, an unauthorized user might not be able to detect whether the synthetic transaction is fake. For example, a synthetic transaction might be randomly generated using sets of real data (e.g., real merchants, real items), and a user might be asked if they conducted that transaction. Such a synthetic transaction might be configured to be real in a variety of ways: for example, it might be associated with a real store, real items, real costs, or the like. For example, as part of authenticating a user trying to access a credit card website, a random store that the user never conducted a transaction at might be selected (e.g., "Joe's Toys"), a synthetic transaction might be generated based on that random store (e.g., Joe's Toys, Wednesday, $50), and a user might be asked to confirm whether or not they conducted that synthetic transaction (e.g., "Did you spend $50 at Joe's Toys last Wednesday?"). As another example, a user might be provided a list of four merchants, including only one where the user has in fact conducted a transaction, and the user might be asked to select, from the merchants, the merchant where they have in fact recently conducted a transaction. In this manner, the question might cause a user to confirm whether or not they conducted a synthetic transaction at a nonexistent merchant, might be asked to select a single valid transaction among a collection of valid and synthetic transactions, or the like. Such questions might be referred to as "false authentication questions" or "false questions," and might be used to prevent nefarious actors from guessing their way through authentication questions and/or learning personal information about a user. After all, if every authentication question presented to the user is generated based on legitimate transaction conducted by a user, nefarious actors might be able to learn sensitive or personal information about a user (e.g., their spending habits, where they shop, their disposable income). As such, the process of using false authentication questions premised on synthetic transactions can significantly improve the accuracy and security of the authentication process, particularly since it avoids a circumstance where all questions are based on genuine transactions conducted by a user.

The use of false, simulated, and/or otherwise fake data (e.g., simulated transactions) to formulate false authentication questions may be undesirably confusing for a user. For example, a computing device might determine, based on a transaction history indicating that a user never conducted a transaction at a particular store (e.g., "Joe's Coffee"), to ask a user to confirm whether or not they conducted a transaction at a particular store. In such an example, the user might be expected to respond in the negative. That said, the user may have in fact conducted a transaction Joe's Coffee, albeit with a different financial account (e.g., another credit card that is not monitored by the system). As such, while the user might correctly respond in the affirmative (e.g., "I did shop at Joe's Coffee"), the user might nonetheless be blocked from accessing their financial account because the computing device might incorrectly assume that the user never conducted a transaction at Joe's Coffee.

Aspects described herein may address these and other problems, and generally improve the quality, efficiency, and speed of computer authentication systems by offering improved selection and generation of authentication questions using synthetic transactions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improved generation of authentication questions using synthetic transactions by retrieving data from external organizations that provide financial services to a user and using that data to inform the generation of synthetic transactions. This may have the effect of avoiding confusion and false rejections during an authentication process, improving the process of authentication overall. According to some aspects, these and other benefits may be achieved by receiving a request for access to a first account associated with a user, then receiving both first account data (corresponding to the first account) and second account data (corresponding to a second account, associated with the user, that is managed by a second organization). Transactions indicated by the first account data and the second account data may be used to generate synthetic transactions which do not result in confusing authentication questions. For example, a synthetic transaction can relate to a merchant that is not indicated by either the first account data or the second account data.

More particularly, some aspects described herein may provide a computer-implemented method for intelligently generating authentication questions by generating a synthetic transaction that is configured to be different from both first transactions, corresponding to a first account of a user, and second transactions, corresponding to a second account of the user that is managed by a different organization. The method may comprise receiving, by a computing device, a request for access to a first account associated with a user, wherein the first account is managed by a first organization. Then, the method may comprise querying a transactions database for first account data corresponding to the first account, wherein the first account data indicates one or more first transactions. The method may next comprise receiving, from a second computing device, second account data corresponding to a second account associated with the user, wherein the second account is managed by a second organization different from the first organization; processing the second account data based on a format of the first account data. Then, the method may comprise identifying, based on comparing the first account data and the processed second account data, one or more second transactions, wherein the one or more second transactions are unique to the second account. The method may next comprise generating, based on the first account data, a synthetic transaction, wherein the synthetic transaction is configured to be different from both the one or more first transactions and the one or more second transactions unique to the second account. Then, the method may comprise generating, based on the synthetic transaction, an authentication question. The method may then comprise receiving a response to the authentication question and providing, based on the response to the authentication question, access to the first account.

According to some embodiments, processing the second account data may comprise, based on determining that a second format of the second account data does not indicate modification of the second account data by the second organization, replacing one or more portions of the second account data. Generating the synthetic transaction may comprise identifying, based on the first account data, a merchant other than one or more merchants corresponding to the one or more second transactions unique to the second account, wherein the synthetic transaction corresponds to the merchant. Generating the synthetic transaction may be based on determining a pattern of transactions conducted by the first account. Receiving the second account data may comprise providing, to the second computing device, at least a portion of the first account data; and receiving, based on the first account data, the second account data. The second computing device may be managed by a third organization, and receiving the second account data may comprise both sending, to the second computing device, authentication credentials associated with the third organization and receiving, from the second computing device and in response to the authentication credentials, the second account data. Processing the second account data may comprise, based on determining that a second format of the second account data is different from a payment card industry standard, processing the second account data using a natural language processing algorithm, wherein the natural language processing algorithm is configured to modify the second format of the second account data based on the format of the first account data. The first account data may comprise a first list of transactions associated with the first account during a time period, and receiving the second account data may comprise providing, to the second computing device, an indication of the time period, wherein the second account data comprises a second list of transactions associated with the second account during the time period. The synthetic transaction may be configured to be similar to one or more past transactions indicated by the first account data.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 6A shows data stored by an organizations database, a transactions database, and a third-party transactions database;

FIG. 6B shows option for generating a synthetic transaction; and

FIG. 6C shows a user interface providing an authentication question that has been generated based on a synthetic transaction.

DETAILED DESCRIPTION

Figure 1:
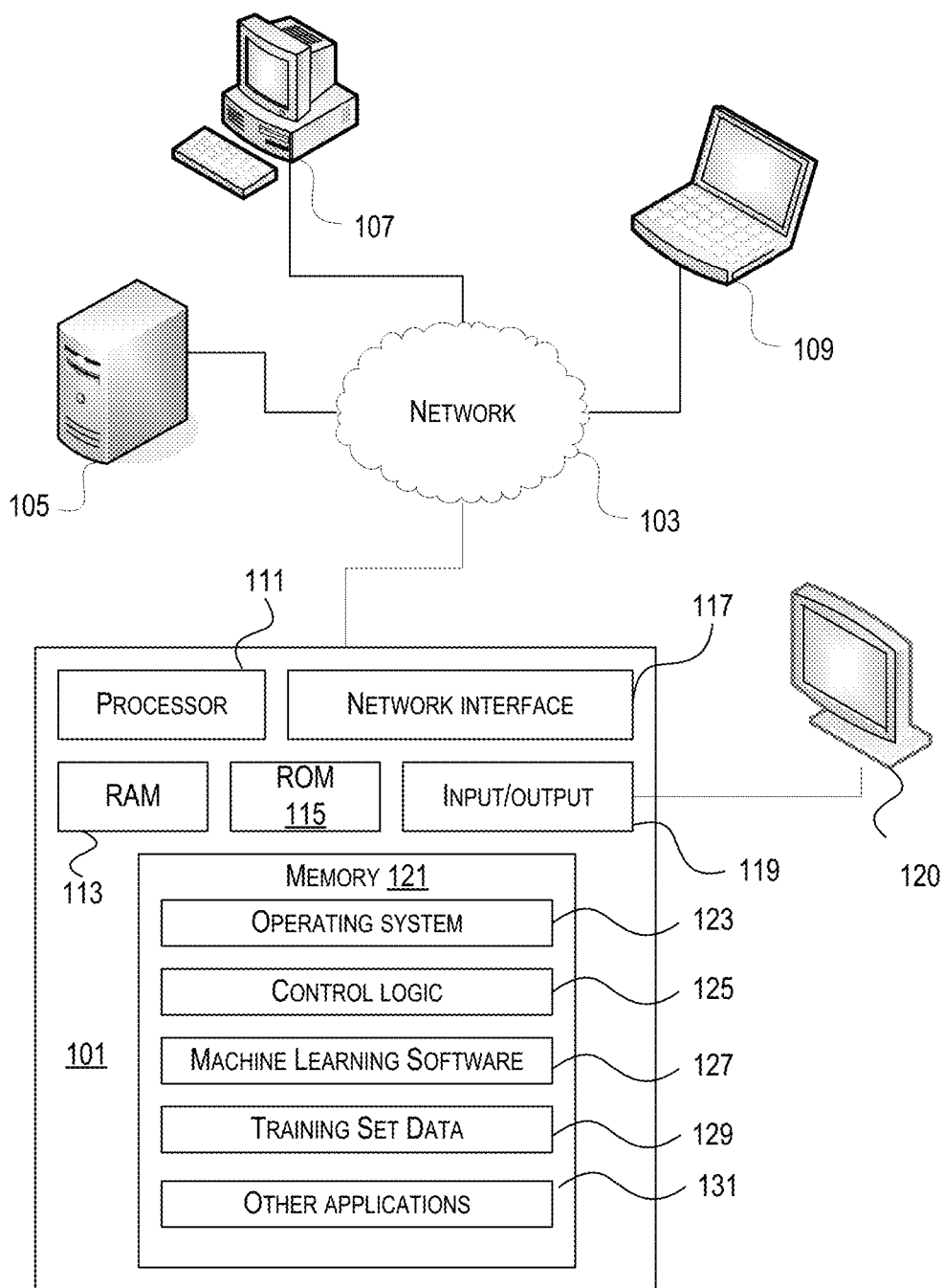
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving the accuracy and fidelity of authentication questions that are generated using, in whole or in part, simulated transactions. As discussed further herein, this combination of features may allow for such questions to avoid confusing users, particularly where those users might conduct transactions using a variety of payment methods.

As an example of the sort of confusion avoided by the method and system described herein, a computing device might use a synthetic transaction to generate an authentication question used to authenticate a user. The computing device might query a transactions database to determine one or more real (actual) transactions conducted by the user over a period of time. Then, the computing device might generate a synthetic transaction. That synthetic transaction might be generated to be significantly different from the real transactions conducted by the user as, otherwise, the user might be confused by the authentication question. Using that synthetic transaction, an authentication question may be generated. Broadly, the goal of an authentication question premised on a synthetic transaction is to ensure that the authentication question is easily answered by a legitimate user (e.g., such that the legitimate user should be able to readily identify the synthetic transaction is fake), but that the authentication question cannot be guessed or otherwise answered by an unauthorized user. For example, the authentication question might ask a user whether they conducted a synthetic transaction (e.g., "Did you buy coffee for $3.00 at Bob's Coffee on Tuesday?"). The computing device might expect that the user will answer in the negative—after all, the authentication question was generated based on a synthetic transaction. That said, the user might have in fact shopped at Bob's Coffee on Tuesday, albeit using a different card (e.g., one with transaction data not available to the computing system), and/or the user might have forgotten what they purchased and/or how much they paid. In such a circumstance, the user might be confused by the authentication question, and authentication might fail.

Aspects described herein improve the functioning of computers by improving the accuracy and security of computer-implemented authentication processes. The steps described herein relate to the authentication of users of computing devices, and in particular improving the manner in which computing devices generate and present authentication questions using simulated data. By improving the fidelity and security of such authentication processes, users might be more readily provided legitimate access to computing resources, while unauthorized actors might be better prevented from gaining access to those same computing resources. Such processes could not be performed by a human being alone, as they focus on computer-implemented authentication and using multiple sources of digital data (e.g., different transaction databases) to lower the possibility of user confusion. This can, in many ways, save computing resources: for instance, by improving the accuracy and clarify of authentication processes, computing devices might be less likely to inadvertently block legitimate attempts to access computing resources.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
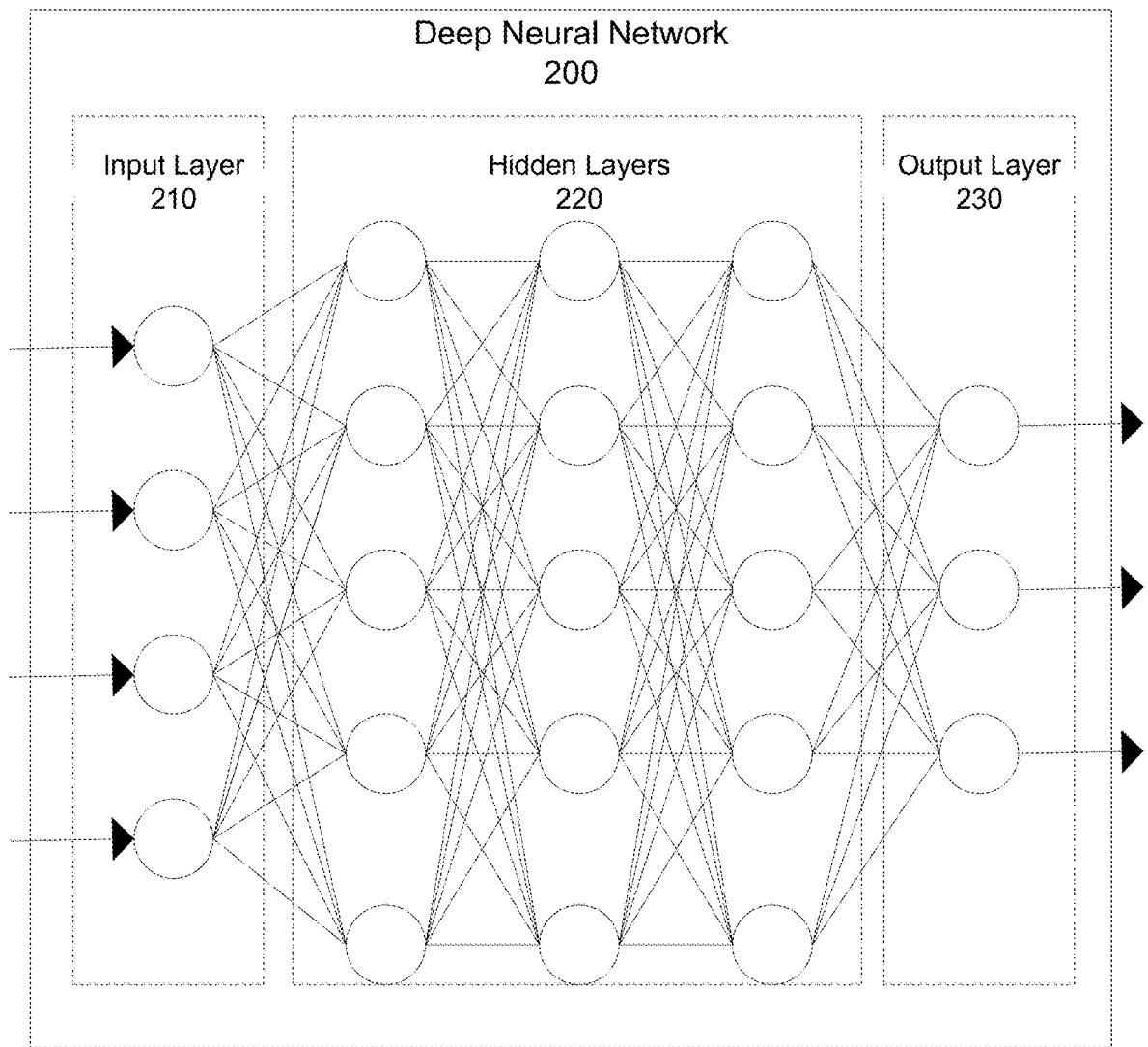
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
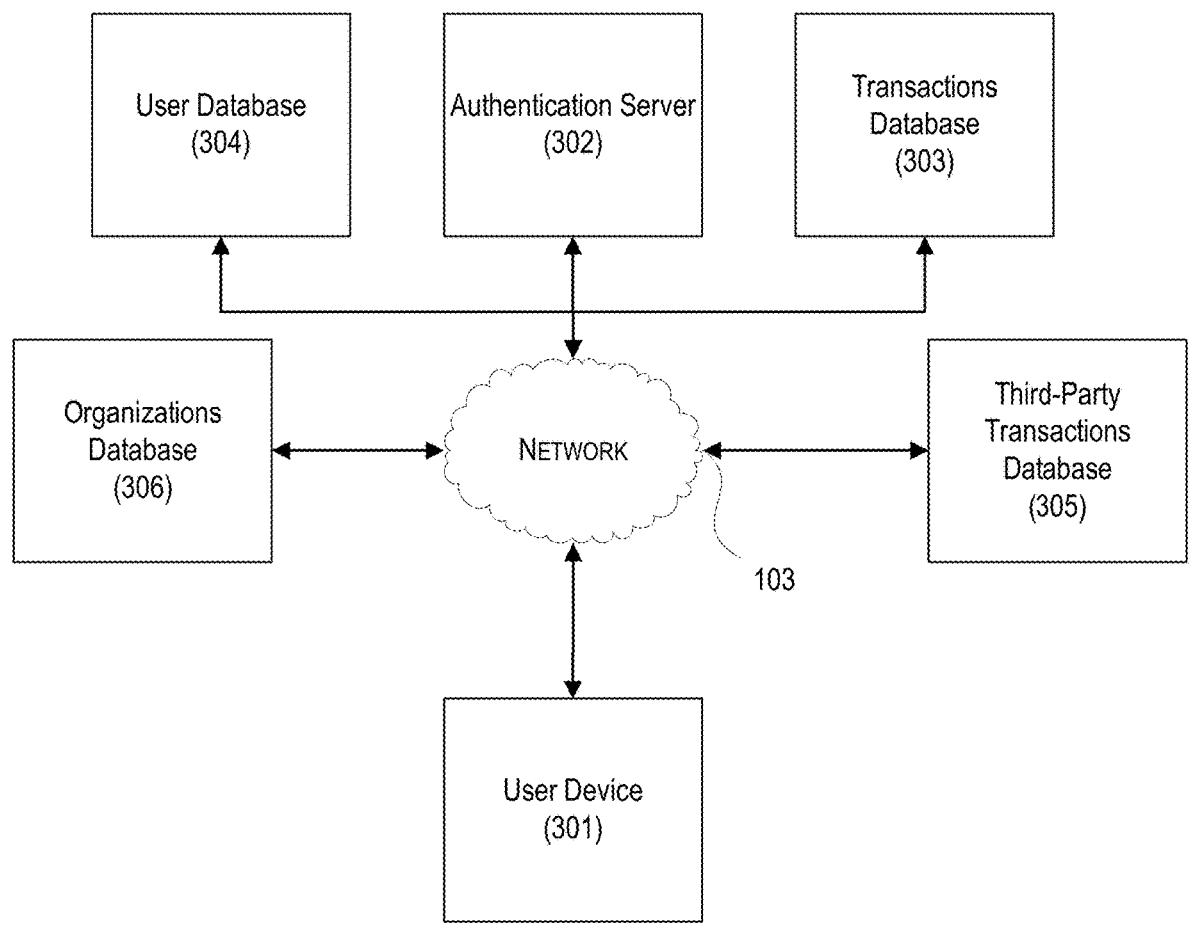
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user database 304, a third-party transactions database 305, and an organizations database 306. The network 103 may be the same or similar as the network 103 of FIG. 1. Each of the user device 301, the authentication server 302, the transactions database 303, the user database 304, the third-party transactions database 305, and/or the organizations database 306 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). For example, the user device 301 might access a website or user interface associated with the authentication server 302. The authentication server 302 may then prompt (e.g., via a user interface) the user device 301 to answer one or more authentication questions. These questions might relate to a username, a password, a user PIN, or the like. In the case of questions relating to a username, a password, or the like, the questions might be generated based on data stored by the user database 304. Such authentication questions might additionally and/or alternatively relate to one or more transactions, such as one or more transactions conducted by a user or one or more synthetic transactions generated by a computing device. Such questions (e.g., those relating to one or more transactions conducted by a user) might be generated based on data stored by the transactions database 303 and/or the third-party transactions database 305. Where an authentication question is premised on a transaction, a user might be prompted to identify whether the transaction is real (e.g., originates from the transactions database 303 and/or the third-party transactions database 305) and/or synthetic (e.g., based on a synthetic transaction generated by the computing device). For example, the organizations database 306 might store a long list of random merchants, and the false answers might comprise indications of one or more of those random merchants. Based on the answers provided by a user of the user device 301, the user might be provided access (to, e.g., a user account).

The user database 304 might store information about one or more user accounts, such as a username, password, or the like. For example, as part of creating an account, a user might provide a username, a password, and/or one or more answers to predetermined authentication questions (e.g., "What is the name of your childhood dog?"), and this information might be stored by the user database 304. The authentication server 302 might use this data to generate authentication questions. The user database 304 might additionally and/or alternatively store preferences for one or more user accounts relating to authentication. For example, the user database 304 might store preferences indicating that certain users are required to use two-factor authentication as part of authentication.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account.

The account data stored by the user database 304 and the transactions database 303 may, but need not be related. For example, the account data stored by the user database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The third-party transactions database 305, like the transactions database 303, might comprise data relating to one or more transactions conducted by one or more financial accounts associated with a second organization different from the first organization. Like the transactions database 303, such data might indicate one or more merchants (e.g., where funds were spent), an amount spent (e.g., in one or more currencies), a date and/or time (e.g., when funds were spent), or the like. While the data stored by the transactions database 303 and the third-party transactions database 305 might be similar, it may be stored in a different format, may have different levels of detail, or the like. For instance, data stored by the transactions database 303 might comprise a geographical location of a particular transaction, whereas that information might not exist in data stored by the third-party transactions database 305.

The organizations database 306 might store data relating to one or more organizations, including indications (e.g., names) of organizations, aliases of the organizations, and the like. That data might be used to generate authentication questions that comprise both correct answers (e.g., based on data from the transactions database 303 indicating one or more organizations where a user has conducted a transaction) and synthetic transactions (e.g., based on data from the organizations database 306, which might be randomly-selected organizations where a user has not conducted a transaction). For example, a computing device might generate a synthetic transaction by querying the organizations database 306 for a list of organizations, then removing, from that list, organizations represented in the data stored by the transactions database 303 and/or the third-party transactions database 305.

Figure 4A:
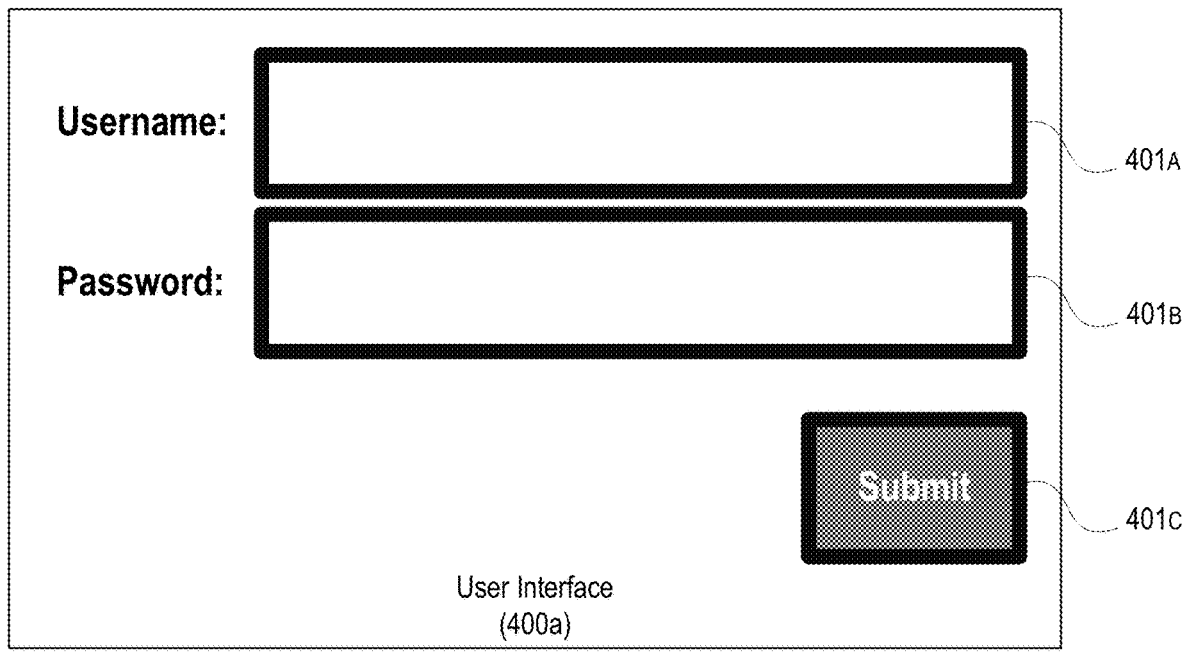
FIG. 4A depicts a user interface for authenticating access, by a user, to a financial account using a username and password.

FIG. 4A depicts an illustrative user interface 400a comprising a username field 401a, a password field 401b, and a submit button 401c. The user interface 400a might be provided by, e.g., the authentication server 302 as part of determining, using data stored by the user database 304, whether to provide the user device 301 access to an account. For example, a user might be prompted to type in a candidate username into the username field 401a and a candidate password into the password field 401b, and the user might be provided access to an account based on whether the candidate username and the candidate password match data stored by the user database 304. As such, the user interface 400a depicts a circumstance where a user is provided two different authentication questions: specifically, as shown in FIG. 4A, they are prompted to provide both a valid username and a valid password.

Figure 4B:
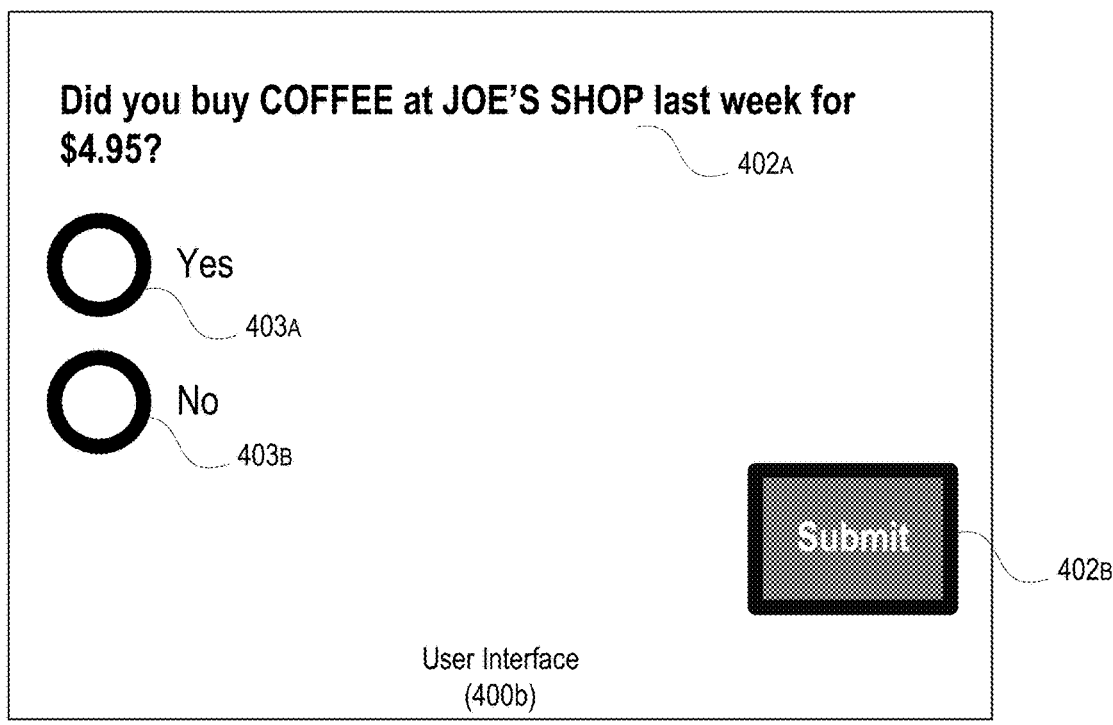
FIG. 4B depicts a user interface for authenticating access, by a user, to a financial account using a question generated based on a synthetic transaction.

FIG. 4B depicts a user interface 400b comprising an authentication question 402a which allows a user to select one of a plurality of options 403a-403b and submit the selection using a submit button 402b. As previously discussed, an authentication question, such as the authentication question 402a, might relate to a synthetic transaction. For example, the authentication question 402a relates to a synthetic transaction that might have been randomly generated by a computing device and which may have never occurred. In some instances, the merchant "Joe's Shop" need not exist: the merchant might be entirely simulated. The plurality of options 403a-403b might comprise one or more correct answers and one or more incorrect answers. For example, in the example provided in FIG. 4B, the answer may be yes (option 403a) if the transaction is genuine (e.g., is reflected in the data stored by the transactions database 303 and/or the third-party transactions database 305) and may be no (option 403b) if the transaction is a synthetic transaction (e.g., was generated by a computing device, such as by using a randomly-selected organization from the organizations database 306).

FIG. 4B illustrates that authentication questions, such as the authentication question 402a, might be generated, in whole or in part, based a synthetic transaction. As discussed above, the transaction inquired about by the authentication question 402a need not have ever occurred. Indeed, "Joe's Shop" might not exist, and—even if it does exist—need not sell coffee. Additionally and/or alternatively, "Joe's Shop" might exist and sell coffee, but for a different price than is indicated by the authentication question 402a.

FIG. 4B also illustrates a potential source of confusion for authentication questions such as the authentication question 402a. In the circumstance depicted in FIG. 4B, if the authentication question 402a is generated using a synthetic transaction, the computing device may assume that only option 403b is correct. That said, the user might have actually conducted a transaction at a "Joe's Shop" in the last week, albeit using a different payment method (e.g., one managed by a different organization, such as the second organization corresponding to the data stored by the third-party transactions database 305). In other words, the synthetic transaction might be inadvertently similar to real-life transactions because the synthetic transaction was generated without knowing all transactions actually conducted by a user.

Having discussed several examples of computing devices which may be used to implement some aspects as discussed further below, discussion will now turn to a method for generating authentication questions using synthetic transactions in a manner that avoids confusion regarding transactions actually conducted by a user.

Figure 5:
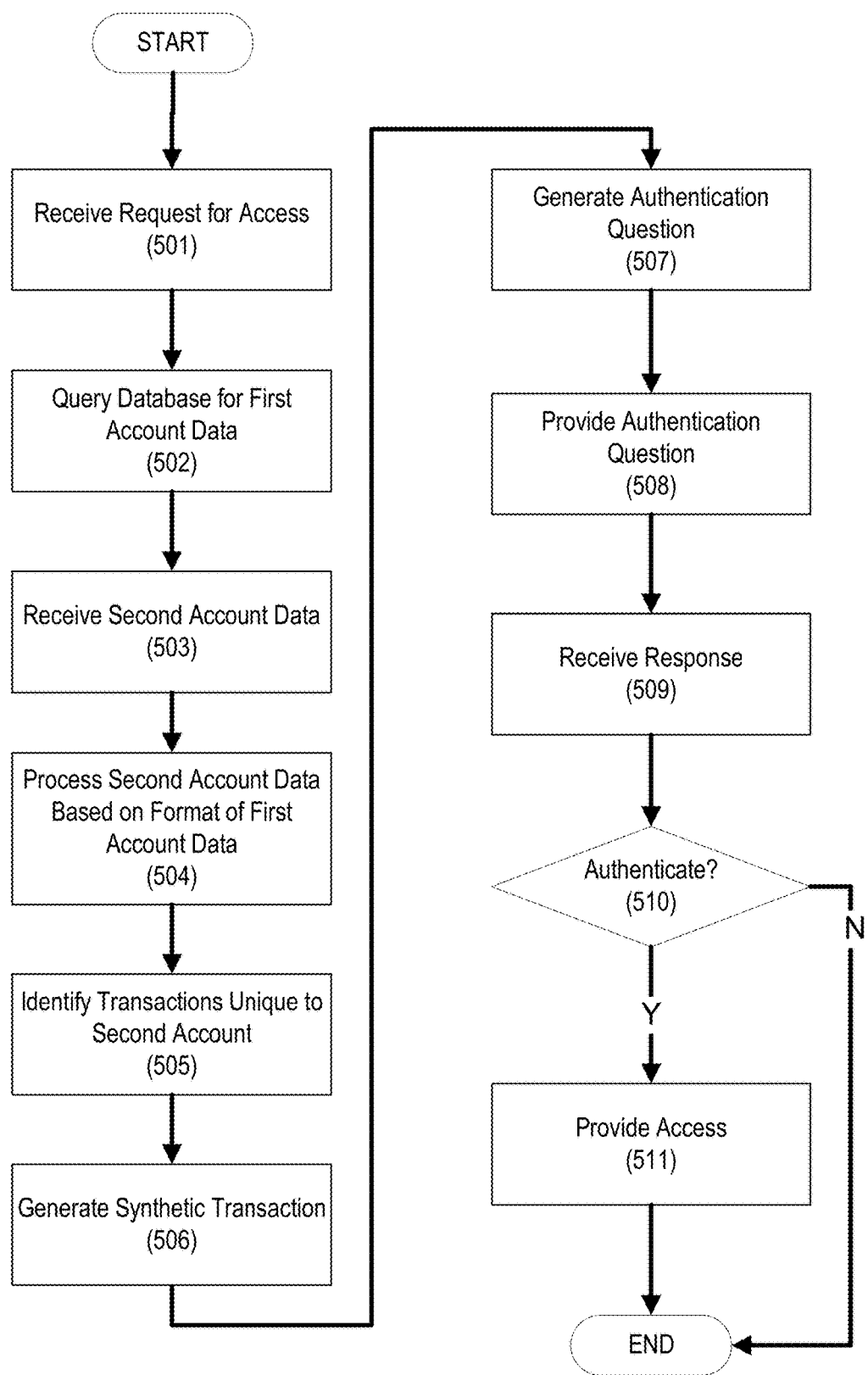
FIG. 5 depicts a flow chart for a method of generating authentication questions.

FIG. 5 illustrates an example method 500 for generating authentication questions in accordance with one or more aspects described herein. The method 500 may be implemented by a suitable computing system, as described further herein. For example, the method 500 may be implemented by any suitable computing environment by a computing device and/or combination of computing devices, such as one or more of the computing devices 101, 105, 107, and 109 of FIG. 1, and/or any computing device comprising one or more processors and memory storing instructions that, when executed by the one or more processors, cause the performance of one or more of the steps of FIG. 5. The method 500 may be implemented in suitable program instructions, such as in machine learning software 127, and may operate on a suitable training set, such as training set data 129. The steps shown in the method 500 are illustrative, and may be re-arranged or otherwise modified as desired.

In step 501, a computing device might receive a request for access. The request for access might be for an account associated with a user. The request for access might be associated with a user accessing, via a user device, a website, a log-in screen, or the like. The request or access might comprise a request for access to an account, such as a financial services account, a banking account, or the like. The request for access might comprise, for instance, a user clicking a "Log In" button on a website. With that said, the request for access need not originate in any particular format or manner.

In step 502, the computing device may query a database (e.g., the transactions database 303) for first account data corresponding to the first account. The first account data might indicate one or more first transactions. For example, the authentication server 302 might query the transactions database 303 to determine one or more transactions conducted by one or more accounts (e.g., accounts with a particular banking institution) over a certain period of time (e.g., over the last month).

The first account data corresponding to the first account might indicate one or more transactions conducted by a user. Such transactions might be conducted with a plurality of different merchants and might relate to a variety of goods and/or services. For example, the first account data might indicate that a particular financial account (e.g., a credit card) was used to purchase coffee at a coffee shop on Wednesday and to pay for a video subscription service on Friday.

In step 503, the computing device may receive second account data corresponding to a second account associated with the user. The second account may be managed by a second organization different from the first organization. In this manner, the computing device may receive account data (e.g., information about transactions conducted by) for a first account (e.g., one associated with a first organization, such as one associated with the account trying to be accessed by a user) as well as a second account (e.g., a third-party account, such as may be managed by an entirely unrelated organization).

By retrieving the second account data, the computing device may, as will be detailed further below, consider transactions conducted by a user that might not have been conducted in manners that might ordinarily be logged and available to the computing device. In other words, this allows the computing device to take authentication steps based on transactions conducted by the user, even if those transactions were not necessarily conducted by the user using an account managed by the organization providing the account.

Receiving the second account data may comprise requesting and retrieving the second account data from a second computing device (e.g., the third-party transactions database 305). Because the second computing device may be associated with a third-party organization (e.g., a competing financial institution, such as a competitor bank), this might require use of an application programming interface (API) and/or using particular queries between the computing device and the second computing device. For example, the computing device may provide, to a second computing device, at least a portion of the first account data. This at least a portion might comprise, for example, a first and last name of a user, a social security number of the user, an e-mail address of the user, or the like. Based on that first account data, the computing device may receive the second account data. In this manner, various organizations might share transaction data by querying shared databases using unique identifiers of customers.

The second computing device from which the second account data is received (e.g., the third-party transactions database 305) may be managed by a third organization, such as an organization which collects transaction data from a variety of different financial institutions. Such an organization might be, for example, accounting and/or financial management software providers, such as the Mint website provided by Inuit, Inc. of Mountain View, California. In such a circumstance, receiving the second account data may comprise sending, to the second computing device, authentication credentials associated with the third organization. For example, the computing device might have unique credentials which authenticate itself with the third organization, thereby indicating that it has permission to receive private transaction information. In response, the computing device may receive, from the second computing device and in response to the authentication credentials, the second account data.

Receiving the second account data may comprise providing, to a second computing device (e.g., the third-party transactions database 305), an indication of a time period associated with the first account data. For the sake of simplicity and to ensure authentication questions are sufficiently memorable, authentication questions may be limited to a certain period of time, such as questions about transactions conducted in the last month. In such a situation, the computing device might receive (e.g., from the transactions database 303) first account data for only a particular period of time (e.g., a month), and might query a second computing device (e.g., the third-party transactions database) for data corresponding to a similar period of time. For example, the first account data may comprise a first list of transactions associated with the first account during a time period, and the computing device may provide, to the second computing device, an indication of the time period. The second account data may then comprise a second list of transactions associated with the second account during the time period.

In step 504, the computing device may process the second account data based on a format of the first account data. Because the first account data and the second account data originate from different organizations, they might be in a variety of different formats, have different levels of comprehensiveness, and the like. For example, the first account data might abbreviate merchant names, whereas the second account data might use unique codes that, when correlated with an organizations database (e.g., the organizations database 306), indicate the identity of a merchant. As another example, the first account data and the second account data might use entirely different textual representations of the same organization: the first account data might refer to the merchant "Bob's Coffee, Inc." as "BOBSCOFFEE," and the second account data might refer to the same merchant as "BOBSCFE." As such, the computing device may process the second account data to convert one or more aspects of the second account data into a format of the first account data. This may advantageously ensure that the sets of data are as similar as possible for subsequent comparison purposes.

Processing the second account data may comprise replacing one or more portions of the second account data. Broadly, portions of the second account data might be replaced so as to render those portions in the same format as the first account data. With that said, in some instances, the second account data might be pre-processed by the third-party organization before it is received by the computing device, rendering processing difficult. In the case where the second account data is not pre-processed by the third-party organization, it can in fact be easier for the first organization to process it: because many point-of-sale and other sales systems provide transaction data in standardized formats, this data can easily be converted by the first organization into a desired format. That said, in the case where the second account data has been pre-processed by the third-party organization, processing can be significantly harder, because the second organization may have used idiosyncratic formats and internal reference codes for certain aspects of data. For example, while a point-of-sale system might have used the code "001" to refer to the sale of a good (rather than a service), the second organization might have converted this string into the text string "GOODSALE." In either circumstance, the first organization might instead use the text string "GOODSALE01." As such, the particular algorithm(s) used to process the second account data might depend on whether the second organization has pre-processed the second account data. For example, based on determining that a second format of the second account data does not indicate modification of the second account data by the second organization, the computing device may replace one or more portions of the second account data using, e.g., a first algorithm (e.g., that converts "001" to "GOODSALE01"). As another example, based on determining that a second format of the second account data indicates modification of the second account data by the second organization, the computing device may replace one or more portions of the second account data using, e.g., a second algorithm (such as one that converts "GOODSALE" to "GOODSALE01").

Processing the second account data may comprise processing the second account data using a natural language processing algorithm. Natural language processing algorithms may advantageously allow the second account data to be processed in a manner which identifies discrete portions of the second account data (e.g., the merchant field(s), the good/service field(s), currency field(s)), even if those portions vary over time or from organization to organization. This approach can be particularly valuable when the second account data varies so greatly from a payment card industry standard that it does not follow an expected format or lexicon. For example, based on determining that a second format of the second account data is different from a payment card industry standard, the computing device may process the second account data using a natural language processing algorithm. That natural language processing algorithm may be configured to modify the second format of the second account data based on the format of the first account data. In other words, the natural language processing algorithm might be used to take unpredictable data and/or data in an unknown format from the second account data and to, as best as practicable, process it to convert it into a format similar to that of the first account data.

In step 505, the computing device may identify, based on comparing the first account data and the processed second account data, one or more second transactions. The one or more second transactions may be unique to the second account. In other words, step 505 may comprise determining transactions indicated by the second account data that are not also present in the first account data. Such transactions might indicate that a user conducted a transaction using a payment method (e.g., credit card, debit card) associated with a third-party, such that the transaction would not be reflected in the data stored by the transactions database 303.

In step 506, the computing device may generate, based on the first account data, a synthetic transaction. The synthetic transaction may be configured to be different from both the one or more first transactions and the one or more second transactions unique to the second account. For example, if the transactions database 303 indicates transactions at Store A and Store C, and the third-party transactions database 305 indicates a transaction at Store B, the synthetic transaction might correspond to a transaction that did not occur at any of Store A, Store B, or Store C. This can advantageously avoid confusion: after all, if the user in fact conducted transactions at all three of Store A, Store B, or Store C, then generating a synthetic transaction that involves any of those stores and using that synthetic transaction to generate an authentication question could undesirably confuse the user. After all, a legitimate user might be tricked into believing they in fact conducted a synthetic transaction at a particular store, especially if they frequent that store often and/or if the transaction in question (e.g., grabbing a coffee, buying a newspaper) might be fairly inconsequential.

The synthetic transaction may be configured to be similar to one or more past transactions indicated by the first account data. Though it may be desirable to avoid confusing the user, it might nonetheless be valuable to ensure that the synthetic transaction conducted by the user emulates their spending sufficiently such that an unauthorized user cannot gain access. As a simple example, it might be undesirable to generate a synthetic transaction relating to a store in Japan for a user located in New York, as, when used as part of an authentication question, it might be easy for an unauthorized user to recognize that this transaction is synthetic and not genuine. As such, the computing device might determine a spending pattern and/or other demographic data associated with a user and, based on that spending pattern and/or demographic data, generate the synthetic transaction. For example, the synthetic transaction might be generated based on the age of a user, their location, whether or not they have a spouse and/or child, whether or not they often go out to eat, whether or not they often shop at big box stores, or the like. The spending pattern might be based on transactions stored by the transactions database 303 and/or the third-party transactions database 305. The demographic data for a user might be stored in the user database 304.

Generating a synthetic transaction may comprise identifying, based on the first account data, a merchant other than one or more merchants corresponding to the one or more second transactions unique to the second account. The computing device might query the organizations database 306 to determine a plurality of merchants which might be used to generate a synthetic transaction. In so doing, the synthetic transaction might use a real merchant, rather than an invented merchant, thereby improving the believability of the synthetic transaction. The computing device might then remove, from that plurality of merchants, merchants represented in the first account data (e.g., the data stored by the transactions database 303) and/or in the second account data (e.g., the data stored by the third-party transactions database 305). In this manner, the remaining merchants in the plurality of merchants are less likely to be merchants where the user has, in fact, conducted a transaction. This may ultimately improve the strength of the authentication question by preventing the computing device from inadvertently generating an authentication question premised on a synthetic transaction involving a merchant where the user has in fact conducted a transaction.

Generating the synthetic transaction may further be based on a pattern of transactions conducted by the first account or the second account. The first account data and/or the second account data might indicate a pattern of transactions conducted by a user. For example, the user might always purchase coffee in the morning, go to a particular lunch spot every weekday afternoon, and the like. This information might be used to generate synthetic questions which are easily detected by a legitimate user but which appear even more realistic to an unauthorized user. For example, the computing device might detect, based on the first account data and/or the second account data, that a user always buys a coffee in the morning on weekdays. Based on that pattern of transactions, the computing device might generate a synthetic transaction showing that the user purchased a coffee in the morning on Saturday. While this purchase might look otherwise legitimate to an unauthorized user (and might thereby prevent them from gaining unauthorized access to an account), the legitimate user might easily recognize that this transaction did not occur.

In step 507, the computing device may generate an authentication question. The authentication question may be based on the synthetic transaction generated in step 506. The authentication question may prompt the user to identify whether the synthetic transaction is genuine. For example, the authentication question might ask the user whether they conducted the synthetic transaction, as is depicted in the user interface 400*b* of FIG. 4B. Additionally and/or alternatively, the authentication question might ask the user to identify one or more genuine transactions from a list of genuine and synthetic transactions. For example, the authentication question might provide the user a list of four transactions (three synthetic, one genuine) and prompt the user to select, from the transactions, the genuine transaction. Additionally and/or alternatively, the authentication question might ask the user to either provide detail for a transaction or indicate it is synthetic. For example, the authentication question might ask a user to specify when they conducted a synthetic transaction, and the user might be prompted to either provide a day of the week (any of which would be an incorrect answer) or indicate that the transaction never occurred (the correct answer).

In step 508, the computing device may provide the authentication question to, e.g., a user device. Providing the authentication question may comprise causing display of the authentication question in a user interface, such as on a website.

In step 509, the computing device may receive a response to the authentication question. The response to the authentication question may be received from a user device. The answer might be a selection of a radio option, a written response in a text box, or the like. The response need not be in any particular format.

In step 510, the computing device may determine, based on the response received in step 509, whether to authenticate the request for access. Determining whether to authenticate the request for access might be based on whether the user correctly answered the question generated in step 507. If the computing device decides to authenticate the request, the method 500 proceeds to step 511. Otherwise, the method 500 ends.

In step 511, based on determining to authenticate the request for access in step 508, access to an account may be provided. Providing access to the account might comprise providing a user (via, e.g., their user device) access to a protected part of a website, to encrypted data, or the like.

FIG. 6A illustrates organizational data that might be stored by the organizations database 306, the transactions database 303, and the third-party transactions database 305. The stores shown in these databases are merely illustrative, and show (in conjunction with FIG. 6B and FIG. 6C) how a synthetic transaction and authentication question might be generated. The organizations database 306 may store a list of a variety of popular organizations (Store A-F, as shown in FIG. 6A), such as stores that customers in a particular region frequent. The transactions database 303 shown in FIG. 6A indicates that a user has shopped at Store A and Store E. The third-party transactions database 305 shown in FIG. 6A shows transactions conducted at Store A, Store D, and Store F.

FIG. 6B illustrates a list of synthetic transaction options 601. The synthetic transaction options 601 shown in FIG. 6B may comprise stores that are indicated in the organizations database 306 of FIG. 6A, but which are not indicated in the transactions database 303 and/or the third-party transactions database 305. In other words, the synthetic transaction options 601 may comprise a list of stores where the user is predicted to not have conducted any transactions.

FIG. 6C illustrates an authentication question, in a user interface 603, that has been generated based on the synthetic transaction options 601 of FIG. 6B. The user interface 602 may permit a user to indicate whether or not they conducted the synthetic transaction. In the example shown in FIG. 6B, the correct answer may be "No," as the authentication question has been premised on a synthetic transaction. Of course, in previous and/or subsequent questions, the user might be asked about legitimate questions as well: for example, the user might be provided a series of transactions, where the user is prompted to identify, for each transaction, whether it is legitimate or synthetic.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   receiving, by a computing device, a request for access to a first account associated with a user;
   querying a transactions database for first account data corresponding to the first account, wherein the first account data indicates one or more first transactions conducted via a first payment method;
   receiving, from a second computing device, second account data corresponding to a second account associated with the user, wherein the second account data indicates one or more second transactions conducted via a second payment method;

generating standardized merchant names by processing the second account data based on a format of the first account data;

identifying, based on comparing the first account data and the processed second account data using the standardized merchant names, one or more second transactions, wherein the one or more second transactions are unique to the second account;

generating, based on the first account data, a synthetic transaction not conducted by the first account or the second account, wherein the synthetic transaction is configured to be different from both the one or more first transactions and the one or more second transactions; and providing, based on a response to an authentication question associated with the synthetic transaction, access to the first account.

2. The method of claim 1, wherein processing the second account data comprises:

based on determining that a second format of the second account data does not indicate modification of the second account data, replacing one or more portions of the second account data.

3. The method of claim 1, wherein generating the synthetic transaction comprises:

identifying, based on the first account data, a merchant other than one or more merchants corresponding to the one or more second transactions unique to the second account, wherein the synthetic transaction corresponds to the merchant.

4. The method of claim 1, wherein generating the synthetic transaction is further based on determining a pattern of transactions conducted by the first account.

5. The method of claim 1, wherein receiving the second account data comprises:

providing, to the second computing device, at least a portion of the first account data; and receiving, based on the first account data, the second account data.

6. The method of claim 1, wherein receiving the second account data comprises:

receiving, from the second computing device and in response to authentication credentials, the second account data.

7. The method of claim 1, wherein processing the second account data comprises:

based on determining that a second format of the second account data is different from a payment card industry standard, processing the second account data using a natural language processing algorithm, wherein the natural language processing algorithm is configured to modify the second format of the second account data based on the format of the first account data.

8. The method of claim 1, wherein the first account data comprises a first list of transactions associated with the first account during a time period, and wherein receiving the second account data comprises:

providing, to the second computing device, an indication of the time period, wherein the second account data comprises a second list of transactions associated with the second account during the time period.

9. The method of claim 1, wherein the synthetic transaction is configured to be similar to one or more past transactions indicated by the first account data.

10. A computing device comprising:

one or more processors; and memory storing instructions that, when executed by the one or more processors, cause the computing device to:

receive a request for access to a first account associated with a user;

query a transactions database for first account data corresponding to the first account, wherein the first account data indicates one or more first transactions conducted via a first payment method;

receive, from a second computing device, second account data corresponding to a second account associated with the user, wherein the second account data indicates one or more second transactions conducted via a second payment method;

generate standardized merchant names by processing the second account data based on a format of the first account data;

identify, based on comparing the first account data and the processed second account data using the standardized merchant names, one or more second transactions, wherein the one or more second transactions are unique to the second account;

generate, based on the first account data, a synthetic transaction not conducted by the first account or the second account, wherein the synthetic transaction is configured to be different from both the one or more first transactions and the one or more second transactions; and provide, based on a response to an authentication question associated with the synthetic transaction, access to the first account.

11. The computing device of claim 10, wherein the instructions, when executed by the one or more processors, cause the computing device to process the second account data by causing the computing device to:

based on determining that a second format of the second account data does not indicate modification of the second account data, replace one or more portions of the second account data.

12. The computing device of claim 10, wherein the instructions, when executed by the one or more processors, cause the computing device to generate the synthetic transaction by causing the computing device to:

identify, based on the first account data, a merchant other than one or more merchants corresponding to the one or more second transactions unique to the second account, wherein the synthetic transaction corresponds to the merchant.

13. The computing device of claim 10, wherein the instructions, when executed by the one or more processors, cause the computing device to generate the synthetic transaction further based on determining a pattern of transactions conducted by the first account.

14. The computing device of claim 10, wherein the instructions, when executed by the one or more processors, cause the computing device to receive the second account data by causing the computing device to:

provide, to the second computing device, at least a portion of the first account data; and receive, based on the first account data, the second account data.

15. The computing device of claim 10, wherein the instructions, when executed by the one or more processors, cause the computing device to receive the second account data by causing the computing device to:

receive, from the second computing device and in response to authentication credentials, the second account data.

16. One or more non-transitory computer-readable media storing instructions that, when executed by one or more processors, cause a computing device to:
   receive a request for access to a first account associated with a user;
   query a transactions database for first account data corresponding to the first account, wherein the first account data indicates one or more first transactions conducted via a first payment method;
   receive, from a second computing device, second account data corresponding to a second account associated with the user, wherein the second account data indicates one or more second transactions conducted via a second payment method;
   generate standardized merchant names by processing the second account data based on a format of the first account data;
   identify, based on comparing the first account data and the processed second account data using the standardized merchant names, one or more second transactions, wherein the one or more second transactions are unique to the second account;
   generate, based on the first account data, a synthetic transaction not conducted by the first account or the second account, wherein the synthetic transaction is configured to be different from both the one or more first transactions and the one or more second transactions; and
   provide, based on a response to an authentication question associated with the synthetic transaction, access to the first account.

17. The computer-readable media of claim 16, wherein the instructions, when executed by the one or more processors, cause the computing device to process the second account data by causing the computing device to:
   based on determining that a second format of the second account data does not indicate modification of the second account data, replace one or more portions of the second account data.

18. The computer-readable media of claim 16, wherein the instructions, when executed by the one or more processors, cause the computing device to generate the synthetic transaction by causing the computing device to:
   identify, based on the first account data, a merchant other than one or more merchants corresponding to the one or more second transactions unique to the second account, wherein the synthetic transaction corresponds to the merchant.

19. The computer-readable media of claim 16, wherein the instructions, when executed by the one or more processors, cause the computing device to generate the synthetic transaction further based on determining a pattern of transactions conducted by the first account.

20. The computer-readable media of claim 16, wherein the instructions, when executed by the one or more processors, cause the computing device to receive the second account data by causing the computing device to:
   provide, to the second computing device, at least a portion of the first account data; and
   receive, based on the first account data, the second account data.

* * * * *